(12) United States Patent
Kinoshita et al.

(10) Patent No.: US 8,487,911 B2
(45) Date of Patent: Jul. 16, 2013

(54) IMAGE DISPLAY APPARATUS WITH IMAGE ENTRY FUNCTION

(75) Inventors: Masayoshi Kinoshita, Hachioji (JP);
Hiroshi Kageyama, Hachioji (JP)

(73) Assignees: Hitachi Displays, Ltd., Chiba-ken (JP);
Panasonic Liquid Crystal Display Co., Ltd., Hyogo-ken (JP)

( * ) Notice: Subject to any disclaimer, the term of this patent is extended or adjusted under 35 U.S.C. 154(b) by 1135 days.

(21) Appl. No.: 12/000,839

(22) Filed: Dec. 18, 2007

(65) Prior Publication Data
US 2008/0198143 A1    Aug. 21, 2008

(30) Foreign Application Priority Data

Feb. 20, 2007    (JP) ................. 2007-039181

(51) Int. Cl.
*G06F 3/042*    (2006.01)
(52) U.S. Cl.
USPC ........................... 345/175; 345/156; 345/173
(58) Field of Classification Search
None
See application file for complete search history.

(56) References Cited

U.S. PATENT DOCUMENTS

| | | | | |
|---|---|---|---|---|
| 4,210,775 A | * | 7/1980 | Rodgers et al. | 178/20.02 |
| 5,359,345 A | * | 10/1994 | Hunter | 345/102 |
| 2003/0076295 A1 | * | 4/2003 | Nakajima | 345/156 |
| 2003/0234759 A1 | * | 12/2003 | Bergquist | 345/92 |
| 2004/0150629 A1 | * | 8/2004 | Lee | 345/173 |
| 2004/0201786 A1 | * | 10/2004 | Park et al. | 349/12 |
| 2005/0225683 A1 | * | 10/2005 | Nozawa | 348/801 |
| 2006/0017710 A1 | * | 1/2006 | Lee et al. | 345/173 |
| 2006/0119590 A1 | * | 6/2006 | Park et al. | 345/175 |
| 2006/0146035 A1 | * | 7/2006 | Cha et al. | 345/173 |
| 2006/0279690 A1 | * | 12/2006 | Yu et al. | 349/199 |

FOREIGN PATENT DOCUMENTS

| | | |
|---|---|---|
| JP | 05-232450 | 2/1992 |
| JP | 2005-129948 | 10/2004 |

* cited by examiner

*Primary Examiner* — Sumati Lefkowitz
*Assistant Examiner* — Jesus Hernandez
(74) *Attorney, Agent, or Firm* — Stites & Harbison PLLC; Juan Carlos A. Marquez, Esq.; Steven J. Weyer, Esq.

(57) ABSTRACT

An image display apparatus with image entry function capable of high-speed and high-accuracy direct screen entry without increasing the peripheral circuit scale or the number of circuit elements for each pixel that lower the pixel aperture ratio. A first pixel circuit and a second pixel circuit are alternately arrayed horizontally. First and second data lines are connected to a data driver and a sensor signal processor circuit. Selector switches are connected to the input terminal of the data driver. Gray scale voltages are sent from the data driver to the first and second data lines, and first and second photo sensor signals are sent to the sensor signal processor circuit.

27 Claims, 16 Drawing Sheets

IMAGE DISPLAY APPARATUS WITH IMAGE ENTRY FUNCTION

CLAIM OF PRIORITY

The present application claims priority from Japanese application JP 2007-039181 filed on Feb. 20, 2007, the content of which is hereby incorporated by reference into this application.

FIELD OF THE INVENTION

The present invention relates to an image display apparatus with an internal photo sensor in the display panel and relates in particular to an image display apparatus with image entry function allowing high-speed, high accuracy direct screen input without lowering the pixel aperture ratio.

BACKGROUND OF THE INVENTION

Image display apparatus containing an image entry function allowing the user to enter information by touching the screen with fingers (hereafter simply called touch) are used in portable terminals such as PDA, and customer guidance terminals such as automated reception terminals. Image display apparatus containing this type of image entry functions utilize known methods including a method that detects the change in resistance in the (screen) section that was pressed, a method to detect the change in capacitance in the pressed section, and a method to detect the change in light in the section where the light was blocked when touched.

In recent years, methods are being developed in particular for detecting the coordinates of the section that was touched by the change in the amount of external light in the pixel structure forming the screen. An apparatus including thin film transistors (TFT) and light sensing elements (photo sensors) formed in pixels on the liquid crystal display panel serving as the liquid crystal display apparatus is disclosed for example in patent document 1.

FIG. 15 is a concept view for describing the pixel structure in an image display apparatus of the related art with the image entry function formed from photo sensors within the pixel. An image display apparatus 2 in the figure is a liquid crystal display panel containing photo sensors (third photo sensor, not shown in drawing) within the pixels. A reference photo sensor PSA (first photo sensor) is installed at the upper end within display region 16 of image display apparatus 2. Also, a reference photo sensor PSB (second photo sensor) is installed outside the display range 16 of image display apparatus 2. The first photo sensor detects backlight and light (external light) irradiated from the observation surface side. The second photo sensor is shielded from light irradiated from the observation surface side, but detects the backlight.

The technology of the related art in other words, includes a first photo sensor for detecting external light and light from a backlight; and a second photo sensor for detecting only light from the backlight and shielded from external light; and a third photo sensor for receiving external light and backlight and using light from the user's touch. The related art further includes a signal scanner unit for receiving and processing the first, second, third sensitivity signals from the first, second, third photo sensors; and a signal processor unit for adjusting the sensitivity signals of the third photo sensor based on the first and second sensitivity signals processed in the signal scanner unit. The technology of the related art can in this way judge the contact (touch) information received from the user touching the screen, even if the external environment changes, by utilizing sensitivity signals from the first photo sensor and the second photo sensor to adjust the third photo sensor.

FIG. 16 is an equivalent circuit diagram for describing the pixel structure for an image display apparatus of the related art with an image entry function made up of photo sensors as pixels. This image display apparatus utilizes a liquid crystal display panel and is disclosed in JP-A No. 2005-129948 as follows. The image display apparatus with liquid crystal display panel includes multiple gate lines (GL), multiple data lines (DL), a first switching element (Q1) electrically connected to a gate line and data line, and a first storage capacitor (holding capacitor, CST1) and a liquid crystal CLC connected to the first switching element (Q1). The apparatus further includes a first voltage line (VL1), a second voltage line (VL2), a second switching element (TS1) for detecting the intensity of the external light L and converting it to an electrical current, a second storage capacitor (CST2) for retaining the charge formed by the electrical current provided from the second switching element (TS1), and a readout line (R) and a third switching element (TS2) for outputting the charge stored in the second storage capacitor (CST2). The second switching element (TS1), second storage capacitor (CST2) and third switching element (TS2) together form one type of photo sensing unit.

SUMMARY OF THE INVENTION

The photo sensor structure of the related art disclosed in JP-A No. 2005-129948 has the following problems. Namely, (1) the first and the second photo sensors are installed on the edge of the display region or outside the display region and are therefore affected by variations in element characteristics or differences in temperature characteristics between the first and second photo sensor; so that the accuracy is low when sensing the state of external light on the center section of the display, etc.

(2) The first, second, and third photo sensor are formed at installation positions away from each other which causes low transmission accuracy when sending detection signals due to differences in resistance among the signal lines sending each sensor's photo detection signals.

(3) High speed signal processing is difficult because the signal scanner unit which is the peripheral circuit must convert the sensing signals for the photo sensor within the display device into decision signals, and a signal controller unit must convert them into control signals, and the sensitivity of the photo sensor within the panel screen must be adjusted.

(4) Installing circuits such as the signal scanner unit and signal controller unit increases the peripheral circuit scale.

(5) Further, in the above technology of the related art, each pixel requires elements including many thin film transistors, which lower the aperture ratio of the pixels that display images, and adding more pixels increases the current consumption. A drop in the aperture ratio lowers the screen brightness, and the increased power consumption shortens the operating time especially in the case of portable terminals. The switching elements vertically (perpendicularly, second direction) and in read line sequence read out the light leakage current from the multiple photo sensing elements arrayed to the side (horizontally, first direction) in the region defined by pixel select lines (gate lines), display data lines (signal lines, data lines) and read lines (sensing lines). So that the time needed to acquire a horizontal/vertical two-dimensional photo signal becomes longer as the number of photo sensor elements and switching elements is increased. The detection speed therefore slows down as the circuit density increases.

This invention therefore has the object of providing an image display apparatus with image entry function capable of high-speed, high-accuracy detection of directly entered screen positions without having to increase the peripheral circuit scale or number of elements per pixel that lower the pixel aperture ratio.

The invention utilizes the widely known flat panel detector (FPD) for X-ray detection as the glass substrate containing photo sensors formed from thin film transistors (TFT). The image display apparatus with entry function of this invention was attained by fabricating photo sensors in the same process where the circuit components are fabricated on the glass substrate of the image display apparatus.

A typical structure and operating principle to achieve the objects of this invention are described next in (1) through (5).

(1) A detection signal line including multiple photo sensors for receiving external light irradiated in from the liquid crystal display panel surface (observation window); and reference signal lines including multiple photo sensors shielded from the external light irradiated in from the panel surface are formed to configure this image display apparatus. Photo sensors not receiving light are shielded from the light by a metal layer or similar object above that photo sensor.

(2) The detection signal lines and reference signal lines are jointly utilized as data lines to send detection signals to detection circuits (sensor signal processing circuits) in peripheral sections during the display signal blanking period.

(3) The multiple detection signal lines and photo sensors for receiving light, and the multiple reference signal lines and photo sensors not receiving light are formed mutually adjacent to each other within the display region (pixel region).

(4) A differential amplifier circuit installed in the peripheral section of the display region amplifies the differential between the reference voltage sent on the reference signal line and the photo sensor signal voltage sent on the detection signal line and sends it to the sensor signal processing circuits.

(5) The sensor signal processor circuit decides if the screen was touched by the A/D (analog/digital) converted signal output.

The structure of this invention is as follows.

(1) This invention is capable of eliminating signal current components caused by backlight irradiating onto the photo sensor.

(2) This invention is capable of eliminating effects from irregularities in the intensity of the irradiated backlight and differences in temperature characteristics between signal lines (detection signal lines, reference signal lines) positioned on both ends of the display region, and signal lines positioned in the center of the display region.

(3) This invention is capable of easily detecting small signals and eliminating effects from crosstalk from lines other than signal lines such as pixel select lines (gate lines) by acquiring the differential between signals on adjacent detection signal lines and signals on reference lines.

(4) This invention is capable of reducing effects from errors caused by differences in wiring resistance, and easily arraying the wire lengths by forming the detection signal lines and reference signal lines adjacent to each other.

(5) This invention is capable of preventing a drop in the pixel aperture ratio due to forming the photo sensor in the image display apparatus, by simplifying the pixel structure by jointly using the detection signal line and reference signal line as data lines for sending display data.

(6) This invention is capable of high-speed detection without increasing the components or circuitry required in processing to correct the backlighting or temperature compensation. Moreover, this invention can reduce the backlighting power consumption by internalizing the photo sensor in the image display apparatus.

DETAILED DESCRIPTION OF THE PREFERRED EMBODIMENTS

Figure 1:
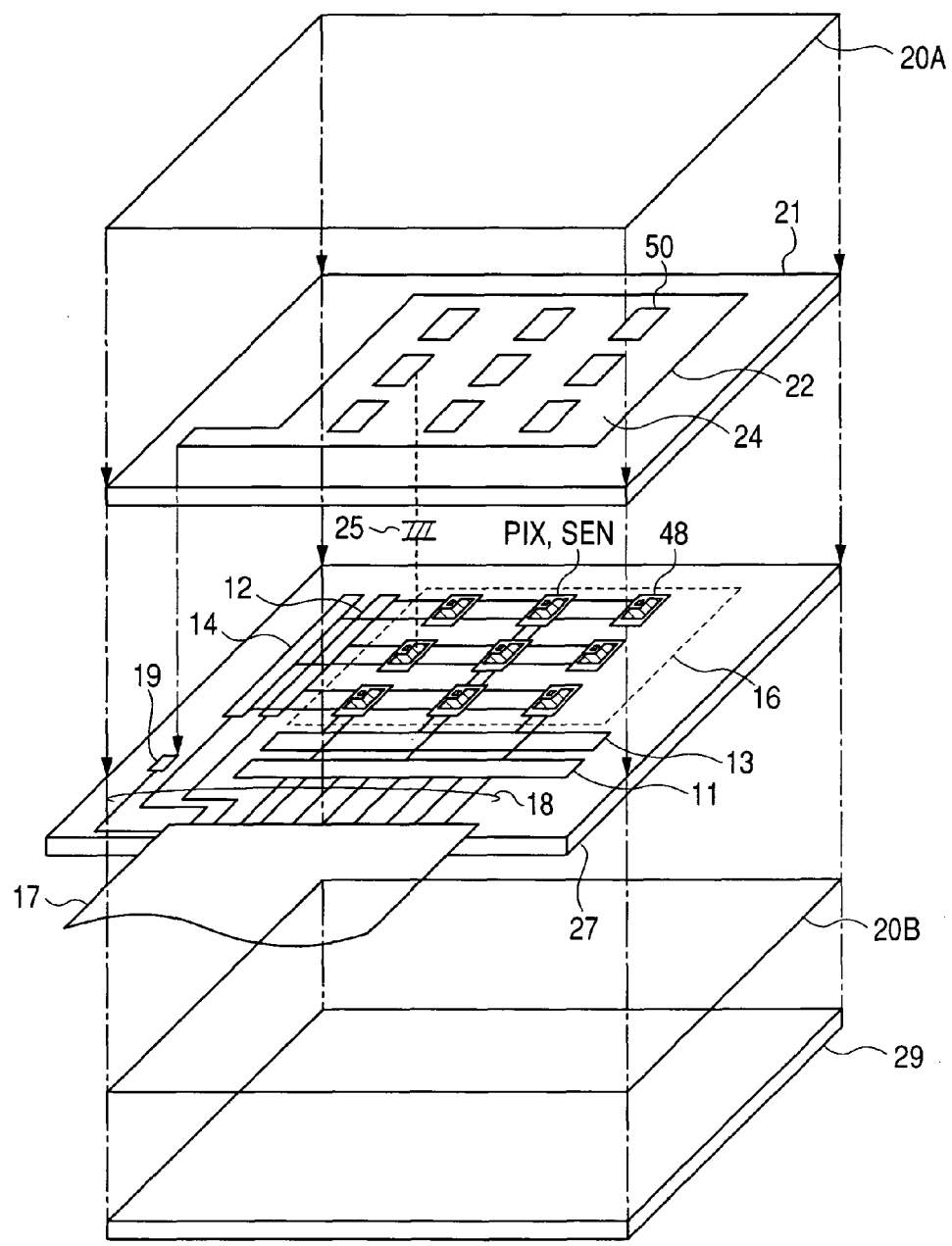
FIG. 1 is a perspective view of the liquid crystal display device with image entry function for describing the first embodiment of the image display apparatus of this invention.

The preferred embodiments of this invention are described next in detail while referring to the drawings.

First Embodiment

FIG. 1 is a perspective view of the liquid crystal display device with image entry function in the first embodiment of the image display apparatus of this invention. In this figure, a display region (pixel region) 16 formed from multiple pixels (shown by pixel electrode 48) arrayed in a matrix is contained on the main surface (inner surface made up of thin film transistors (TFT), etc.) of the lower glass substrate 27 serving as the first insulator substrate (TFT substrate). The pixel PIX making up the display region 16 contains a photo sensing function SEN along with a display function. The outer side of the pixel region 16 on the main surface of this glass substrate 27 contains: a data driver 11 connecting to the source electrode or the drain electrode (here, the source electrode) of the switching TFT (first thin film transistor, described later on) for pixel display, a gate driver 12 for applying a select signal to the gate electrode of the pixel switch TFT made up of pixels, a sensor driver (sensor readout circuit) 14 for reading out the pixel detection signal, and a sensor signal processor circuit 13 for processing the detection signal that was read out and detecting the touched pixels. The sensor signal processor circuit is installed on the side opposite the data driver 11 close to the pixel region 16.

A flexible printed circuit (FPC) 17 and pattern wiring 18 on the lower glass substrate 27 are connected between the data driver 11, gate driver 12, sensor signal processor circuit 13, sensor driver 14; and the control circuit 15 (described later on) and data source and upper information processor circuit (host computer, not shown in drawing) installed on the outer side. This control circuit 15 (described later on) can also be formed on the lower glass substrate 27.

Multiple color filters (shown by pixel aperture 50) corresponding to each pixel formed on the main surface of lower glass substrate 27 are compartmentalized into screen sections by light-blocking film (black matrix) 24 on the main surface of the upper glass substrate 21 serving as the second insulator substrate. An opposite facing electrode (common electrode) 22 is contact-formed above this film 24. A liquid crystal 25 is sealed in the opposing gaps on the main surface of the lower glass substrate 27 and the main surface of this upper glass substrate 21. An orienting film with a function for controlling the orientation (polarization) of the liquid crystal at the boundary between the liquid crystal 25 and opposing electrode 22 and pixel electrode 48 is also formed but not shown in the drawing. This state is also the same from FIG. 2 onwards. The opposing electrode 22 applies an opposing electrode voltage from the connection terminal 19 installed on the lower glass substrate 27.

The liquid crystal display panel includes an upper polarized plate 20A attached to the surface (observation surface) of the upper glass substrate 21, and a lower polarized plate 20B attached to the surface (rear side) of the lower glass substrate 27. The optical (photo) absorbance axis of upper polarized plate 20A and the optical absorbance axis of lower polarized plate 20B are installed in a crossed Nichol configuration. A backlight 29 is installed on the back side of the lower glass substrate 27 making up this liquid crystal display panel.

The liquid crystal display device in FIG. 1 utilized a liquid crystal display panel type containing an opposing electrode (joint electrode) 22 on the main surface of the upper glass substrate 21. However, even if the liquid crystal display panel type contains the opposing electrode 22 on the main surface of the lower glass substrate 27, the pixel circuit PIX including the photo sensing function SEN including a photo detecting TFT (second thin film transistor) and a switching TFT (first thin film transistor) will be the same structure except for the electrode positions and the electrode shape.

Figure 2:
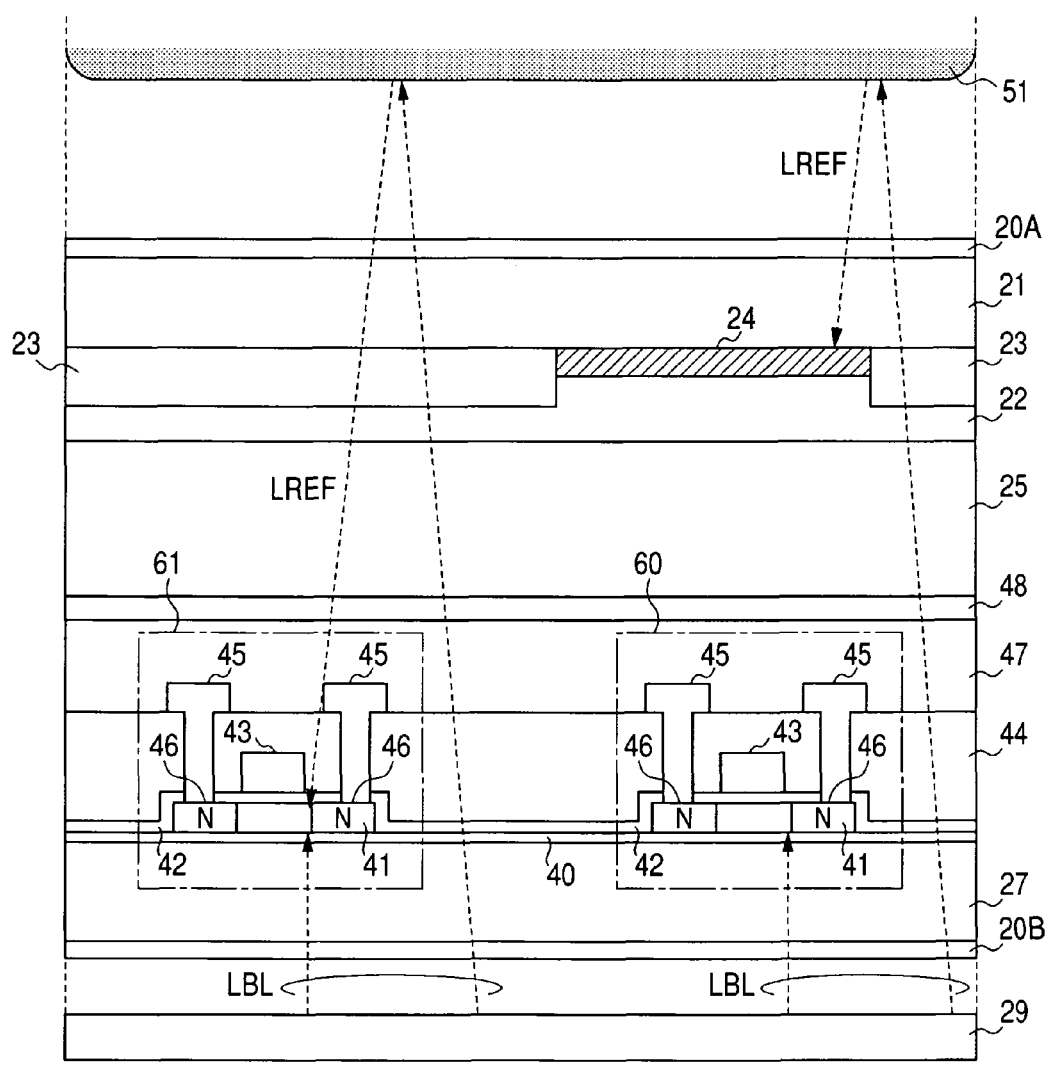
FIG. 2 is a cross sectional view of one pixel in the liquid crystal display device with image entry function shown in FIG. 1, for describing the first embodiment of the image display apparatus of this invention.

FIG. 2 is a cross sectional view of one pixel of the liquid crystal display device with image entry function shown in FIG. 1 for describing the first embodiment of the image display apparatus of this invention. This pixel contains a photo sensor shielded from external light from the observation surface side. The liquid crystal display device with image entry function contains a photo sensor (photo detector means) as the image entry function. This photo sensor is formed on the main surface of the lower glass substrate 27, and is made up of a combination of a photo sensing thin film transistor (photo detection TFT, sensor TFT) 61 and a switching TFT 60.

FIG. 2 shows the state where the finger 51 (hereafter, finger) of the operator (user) has touched this pixel. The photo sensor TFT 61 formed on the main surface of the lower glass substrate 27, is installed below the color filter 23 formed on the main surface of the upper glass substrate 21. The light LBL from the backlight 29 is reflected from the finger 51, transmits as the reflected light LREF from the upper glass substrate 21 side to the color filter 23, and irradiates onto the photo sensor TFT 61. A portion of the light LBL from the backlight 29 also irradiates from the lower side of the photo sensor TFT.

The switching TFT 60 formed on the main surface of the lower glass substrate 27 on the other hand, is installed in the same way below the black matrix 24 formed on the main surface of the upper glass substrate 21. In this switching TFT 60, the black matrix 24 blocks the reflected light LREF of light LBL from the backlight 29 that was reflected by the finger 51, so that only the light LBL arriving from the backlight via the rear surface is irradiated onto the switching TFT 60.

The reference numeral 40 in FIG. 2 denotes the insulator film (underlayer film made from silicon oxide and silicon nitride film), 41 is the polysilicon layer, 42 is the gate insulator film, 43 is the gate electrode, 44 is the interlayer insulator film, 45 is the metallic layer for the source electrode—drain electrode, 46 is the contact hole, and 47 is the planar insulator film.

Figure 3A:
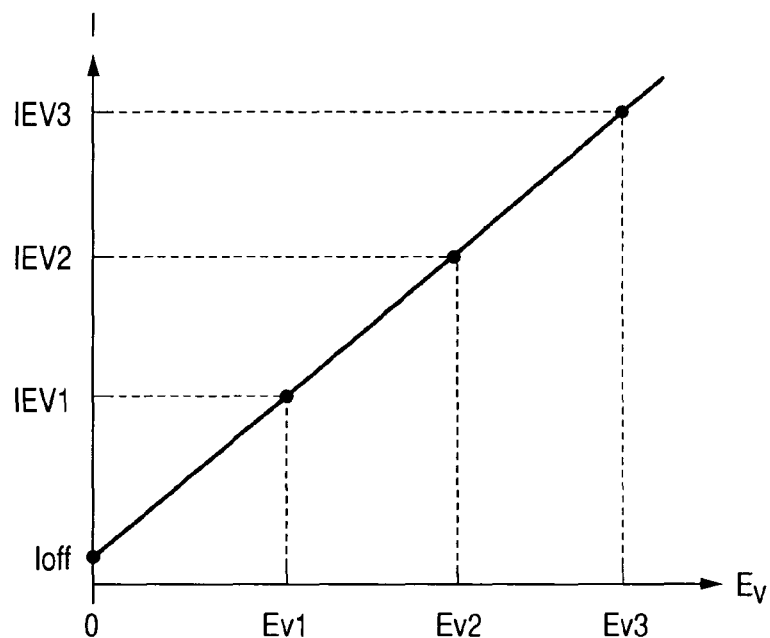
FIG. 3A is a graph showing the relation of the drain current I on the luminance Ev for light irradiated onto the thin film transistor.
Figure 3B:
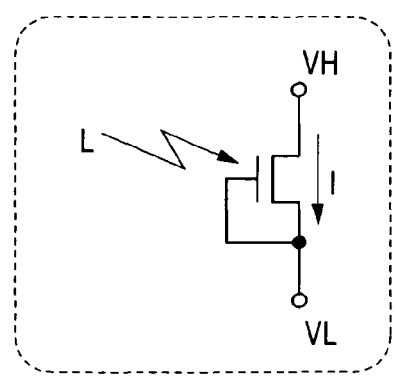
FIG. 3B is a drawing showing the operation of the thin film transistor of FIG. 3A.

FIG. 3A and FIG. 3B show the dependence of the drain current I on the luminance Ev for light irradiated onto the thin film transistor. FIG. 3A shows the dependence of the drain current I on the luminance Ev when the light L irradiates onto the TFT. The horizontal axis in the figure is the luminance Ev of the light L irradiating on the TFT, and the vertical axis is the drain current I of the TFT. As shown in FIG. 3B, a high voltage potential VH is applied to the drain of the TFT and a low voltage potential VL is applied to the source; and shorting the gate and source generates a drain current Ioff caused by the dark current, and the energy from the light during irradiation by light L causes electrons in the channel in the TFT from the valence band to directly excite the conduction band, causing a drain current I dependent on the light intensity L to flow. If the luminance when no light L is irradiated on the TFT is regarded as 0 (zero), then the drain current I increases from Ioff to IEV1, IEV2, and IEV3 in proportion to the luminance Ev of the light L, as the luminance of the light L irradiated onto the TFT gradually increases to EV1, EV2, and EV3. The image display apparatus of this embodiment makes use of a current flow dependent on the luminance of light on the TFT to render input (entry) functions such as touch panel function by fabricating the TFTs on a glass substrate.

Figure 4:
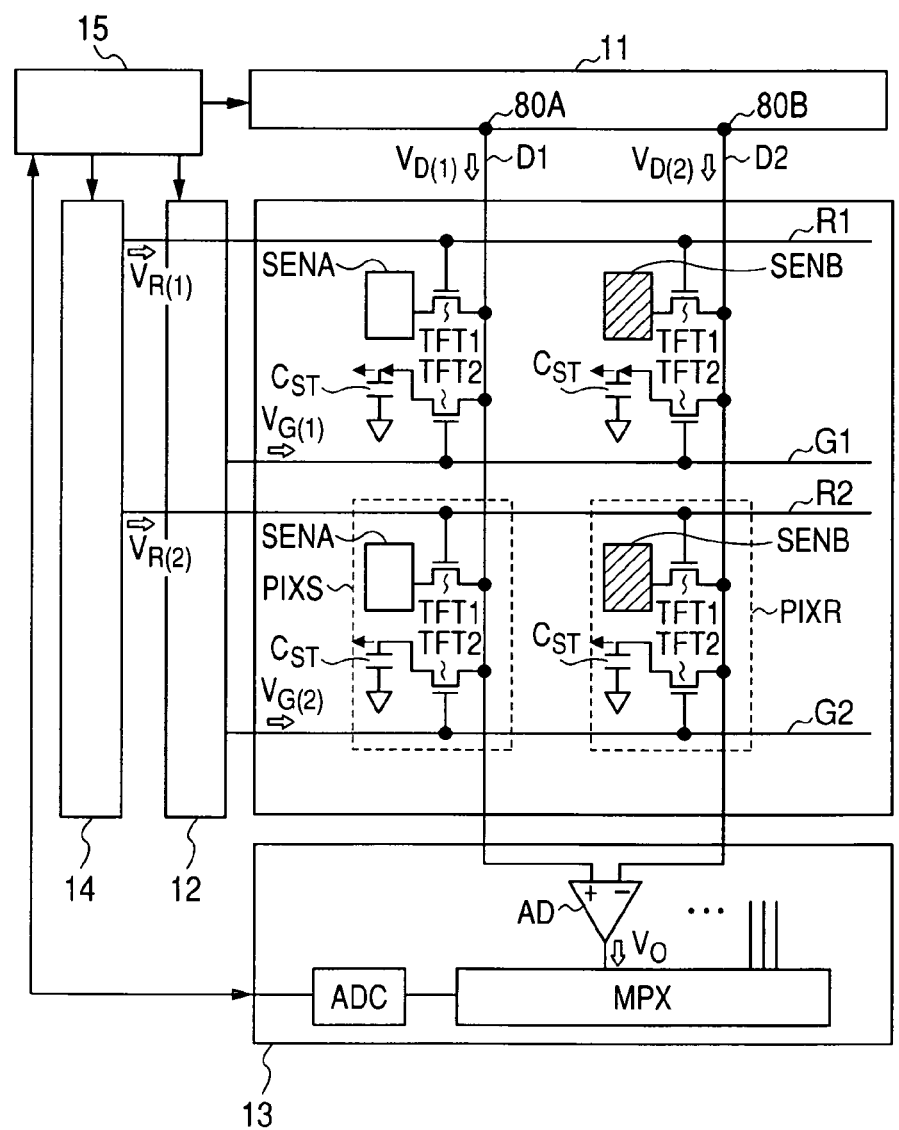
FIG. 4 is a circuit diagram for describing the first embodiment of the image display apparatus of this invention.

FIG. 4 is a circuit diagram for describing the first embodiment of the image display apparatus of this invention. The pixel circuit here is described as pixels arrayed in a 2×2 matrix. The pixel circuit includes a first pixel circuit PIXS (first pixel) containing a first photo sensor (photo sensor receiving external light) SENA and not shielded from external light input from the observation surface side and a switching TFT 1 and a storage capacitor $C_{ST}$ and liquid crystal (not shown in drawing); and a second pixel circuit PIXR (second pixel) containing a second photo sensor (photo sensor not receiving external light) SENB shielded from light and a switching TFT 1 and a storage capacitor $C_{ST}$ and liquid crystal (not shown in drawing). The first photo sensor SENA and the switching TFT1 are connected in serial in the first pixel circuit PIXS; and a first data line D1 with a joint detection signal line is connected to one end of the switching TFT 1, and the liquid crystal pixel electrode (not shown in drawing) is connected to the switching TFT 2, and the first data line D1 is connected to one of the switching TFT 2. The liquid crystal section is shown here as a circuit with the liquid crystal capacitor and the storage capacitor $C_{ST}$ in parallel and the connection to the pixel electrode serving as one electrode of the liquid crystal capacitor is here shown by the arrow. This structure is the same for the following descriptions in FIG. 9, FIG. 10 and FIG. 12.

Instead of the first photo sensor SENA in the first pixel circuit PIXS, the second pixel circuit PIXR is made up of a second photo sensor SENB shielded from external light irradiated from the observation side. Other than the one end of the switch TFT 1 being connected to the second data line D2 also functioning as the detection signal line, and one end of the switch TFT 2 being connected to the same second data line D2, the structure of the second pixel circuit PIXR structure is identical to the first pixel circuit PIXS. The first pixel circuit PIXS and the second pixel circuit PIXR are in fact arrayed in alternate rows horizontally (to the sides of FIG. 4). The first and second data signal lines D1, D2 that supply display data are connected to the data driver 11 and the sensor signal processor circuit 13. The input terminal on the data driver 11 connects to the selector switches 80A, 80B. The data driver 11 sends gray scale voltages $V_{D(1)}$, $V_{D(2)}$ to the first and second data lines D1, D2, and sends the first photo sensor SENA and second photo sensor SENB signals to the sensor signal processor circuit 13 at the drive timing described later on.

The sensor signal processor circuit 13 contains a differential amplifier AD, a multiplexer MPX, and an AD converter ADC. The first data line D1 is connected to the first pixel circuit PIXS and the second data line D2 is connected to the first pixel circuit PIXR. Signal voltages are input to the differential amplifier AD formed in the sensor signal processor circuit 13. The multiplexer MPX connects to the output of the differential amplifier AD, and sends signals from the selected multiple differential amplifiers to the AD converter ADC. The gate lines G1, G2 functioning as pixel select lines are connected to the gate driver 12 and send the gate voltages $V_{G(1)}$ and $V_{(G)2}$. Further, the read lines R1, R2 connect to the gate electrodes of the switching TFT 1 connected to the photo sensor, and their read signals $V_{R(1)}$, $V_{R(2)}$ are then sent from the sensor driver 14. The control circuit 15 sends control signals to the gate driver 11, and the gate driver 12 and the sensor driver 14, and sends processing signals from the detection circuits.

Figure 5:
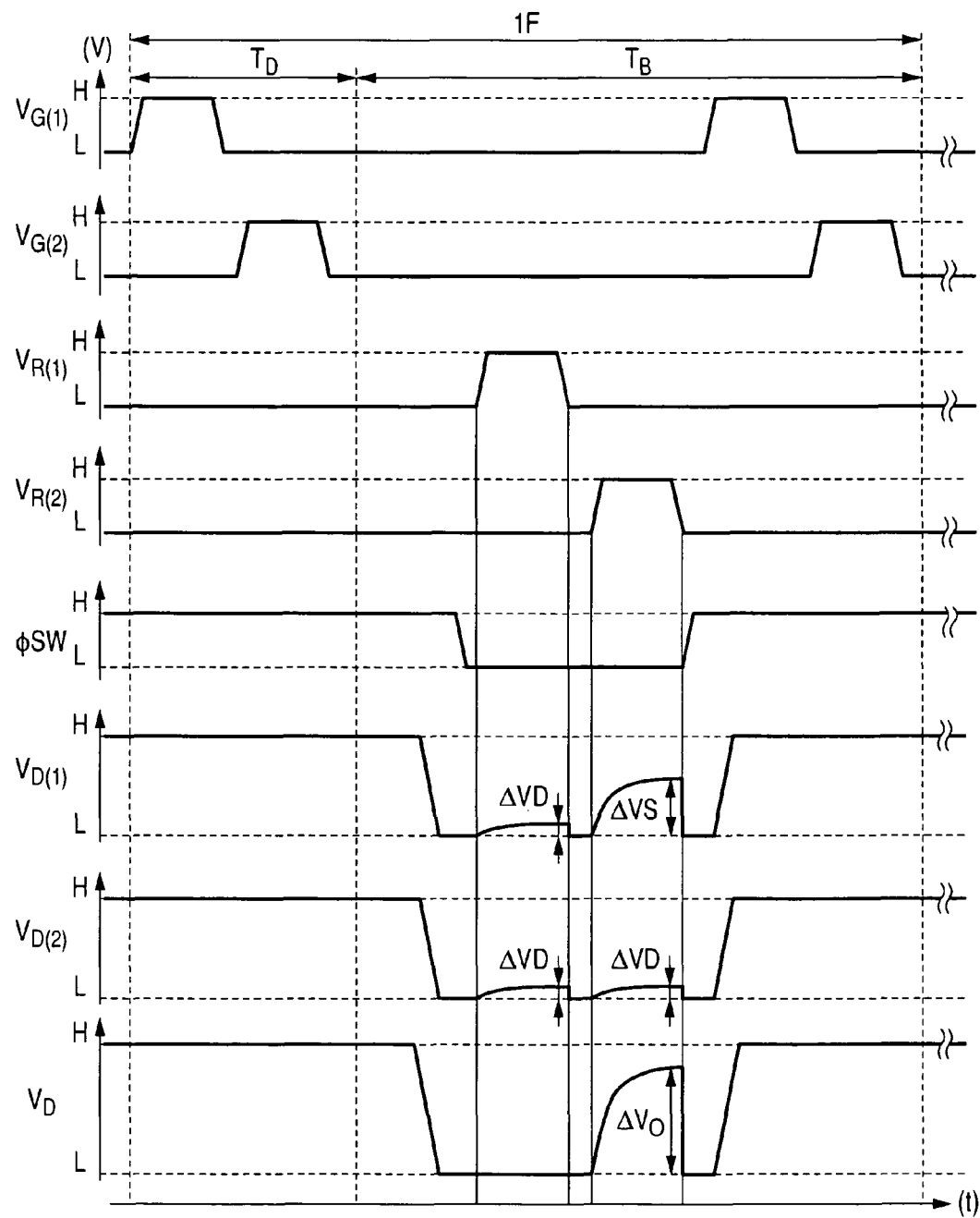
FIG. 5 is a drive timing chart for the first embodiment of the image display apparatus of this invention.

FIG. 5 is a drive timing chart for the first embodiment of the image display apparatus of this invention. The image display apparatus usually outputs a video signal (image signal) for one screen within one frame period (1F) of 60 Hertz. One frame period is made up of a display period $T_D$ where control signals $V_{G(1)}$, $V_{G(2)}$ (scanning signals) are applied to the gate lines G1, G2, and image signals $V_{D(1)}$, $V_{D(2)}$ are input to the first and second data lines D1, D2; and a blanking period $T_B$ for retrace from two pixels to one pixel without displaying an image.

The image display apparatus of the first embodiment performs photo detection (photo sensing operation) within the blanking period $T_B$. The operation in display period $T_D$ is described first. The scanning signals $V_{G(1)}$ through $V_{G(2)}$ are applied to the gate lines G1, G2 and it transitions from low level (L) to high level (H), and scan in order from the pixels (pixels on first line) belonging to the applicable gate line G1 to the pixels (pixels on second line) belonging to the gate line G2. The voltage potentials $V_{R(1)}$, $V_{R(2)}$ applied to the read lines R1, R2 at this time are always at low level (L), and the switching TFT 2 is in the off state. The data driver 11 supplies the image signals $V_{D(1)}$, $V_{D(2)}$ to the first and second data lines D1, D2, and images are displayed on the screen based on these image signals.

The photo detection (sensing) period is described next. The selector switches 80A, 80B switch the selector signal φSW from high level (H) to low level (L) to isolate the first and second data lines D1, D2 from the data driver 11. The voltage potentials $V_{R(1)}$, $V_{R(2)}$ applied to the read lines R1, R2 in this period transition from low level (L) to high level (H). During this scanning, the photo current generated from the first photo sensor SENA that senses the touch-reflected light LREF and the backlight light. LBL; and the photo current generated from the shielded second photo sensor SENB sensing the backlight LBL is read out as the voltages $V_{D(1)}$, $V_{D(2)}$ on the first and second data lines D1, D2. The voltage differential ΔVD or ΔVS that was voltage converted is then sent to the detector circuit 13.

The ΔVD is here a voltage differential made up of backlight light LBL signal components. As shown in FIG. 2, the ΔVS is a voltage differential made up of backlight light LBL and touch reflected light LREF signal components. The higher the intensity of the light LREF irradiated onto the photo sensor TFT 61, the larger the voltage differential ΔVS. The differential amplifier AD in the sensor signal processor circuit 13 in FIG. 4, amplifies the differential in the signal voltages $V_{D(1)}$, $V_{D(2)}$ on the first data line D1 and the second data line D2; and amplifies the differential ΔVS−ΔVD in the first and second data lines D1, D2 in particular when the user has touched the screen; and sends the signal value digitally converted in the analog-digital converter ADC to the control circuit 15, and the address (secondary coordinates) of the pixel position judged as last touched by finger on the screen is then detected.

Figure 6A:
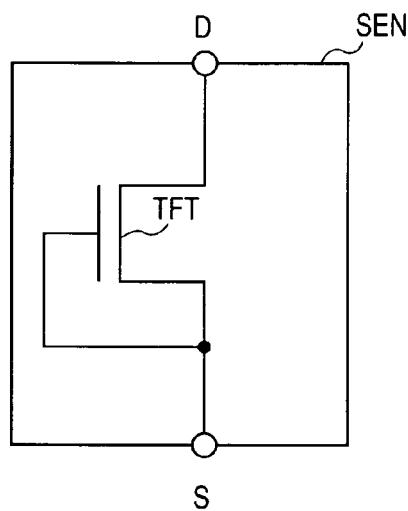
FIG. 6A is a drawing showing the structure of the first photo sensor PIXS in the pixel circuit of FIG. 4.
Figure 6B:
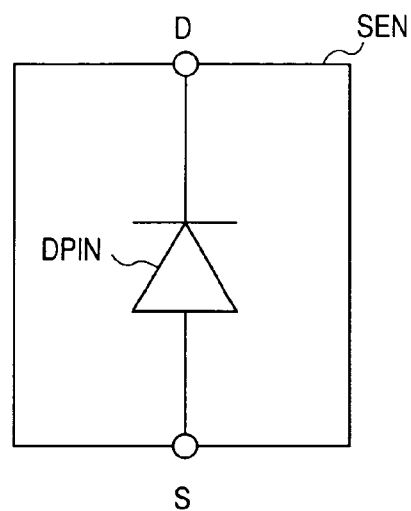
FIG. 6B is a drawing showing the photo sensor structure utilizing a PIN diode.
Figure 6C:
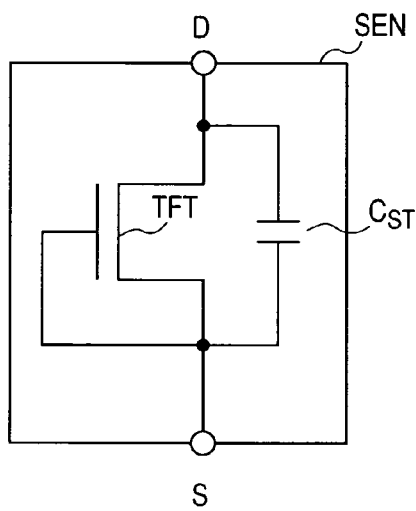
FIG. 6C is a drawing showing the photo sensor structure utilizing a TFT for receiving the light.
Figure 6D:
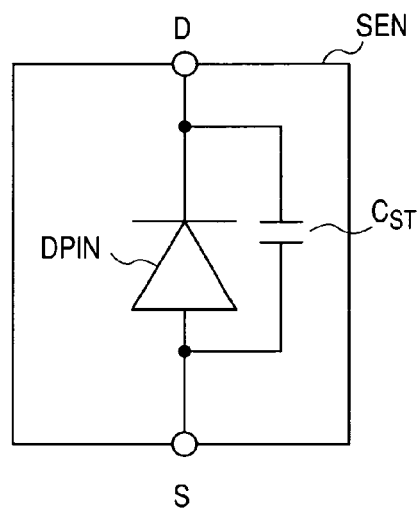
FIG. 6D is a drawing showing the photo-receiving TFT of FIG. 6C structured from a PIN diode.

FIGS. 6A to 6D are drawings showing the structure of the photo sensor in the pixel circuit described in FIG. 4. FIG. 6A shows the structure of the TFT in the photo sensor receiving light, where the gate electrode and source electrode are shorted and connected by a diode, and includes drain (D) and source (S) terminals. In FIG. 6B the photo sensor structure is a PIN diode, and includes drain (D) and source (S) terminals. In FIG. 6C the photo sensor structure is TFT for receiving the light and a storage capacitor CS, with the TFT and storage capacitor CS connected in parallel, and including drain (D) and source (S) terminals. The photo current generated when the light-receiving TFT is irradiated with light, in this way charges the storage capacitor CS. FIG. 6D shows the photo-receiving TFT of FIG. 6C structured from a PIN diode. Other than the point that the TFT for receiving light in the first photo sensor PIXS was changed to a TFT not receiving light, this structure is identical to the structure of the light-shielded second photo sensor PIXR in FIG. 4 so a description is omitted here.

Figure 7:
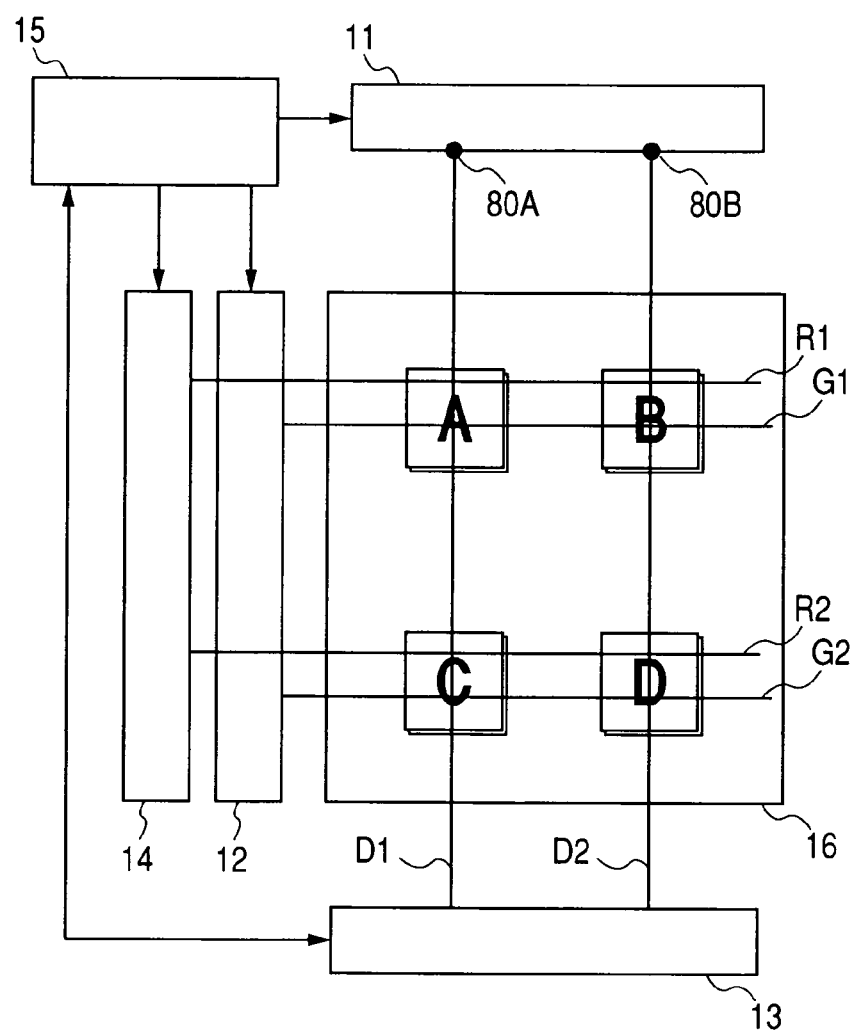
FIG. 7 is a block diagram of the image display apparatus of the first embodiment of this invention.

FIG. 7 is a block diagram of the image display apparatus of the first embodiment of this invention. A gate driver 12, and a data driver 11, and a sensor driver 14, and a sensor signal processor circuit 13 are formed on the glass substrate. The state here shows a specified screen image shown for touch selection on the display region 16. The switch state display is labeled as the "A", "B", "C" and "D" images. The state here indicates a standby state awaiting the user to selectively touch one of the "A", "B", "C" and "D" switches. When the user has touched a switch state labeled as "A", "B", "C" or "D" on the screen, a signal voltage is sent to the sensor signal processor circuit 13 by way of the first data line D1 (detection signal line) and the second data line D2 (reference signal line) based on the read signal on the read lines R1, R2 from the sensor driver 14 in the blanking period. The sensor signal processor circuit 13 sends the digitally converted decision signal to the control circuit 15. The control circuit 15 decides if the screen was touched and extracts the secondary address (XY coordinates) of the touched image display.

Figure 8A:
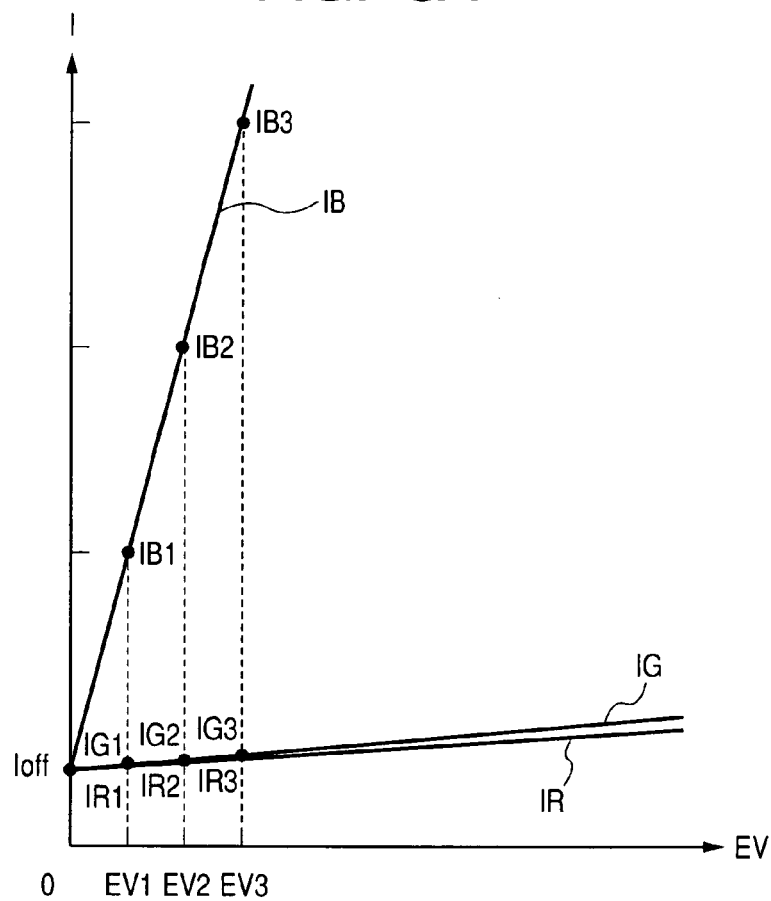
FIG. 8A is a graph for describing the functions and operation of the photo sensor.
Figure 8B:
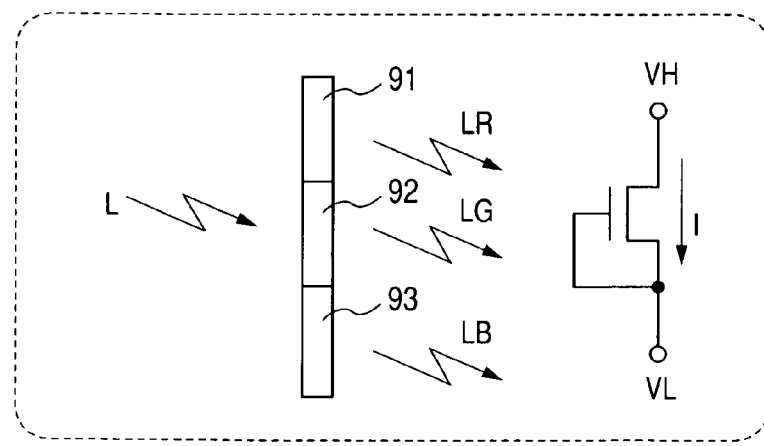
FIG. 8B is a drawing showing the light separated by the color filters.

FIGS. 8A and 8B describe the function and operation of the photo sensor. FIG. 8A is a graph showing the dependence of the drain current I and illuminance of light LB on the blue light wavelength λ (B), of light LG on the green light wavelength λ (G), and of the light LR of the red light wavelength λ (R) that irradiated on the thin film transistor (TF) shown in FIG. 8B and transmitted through the red filter 91, the green filter 92 and the blue filter 93. The horizontal axis in the figure is the illuminance (EV) of the light L irradiated onto the TFT, and the vertical axis is the drain current (I) of the TFT. As shown in FIG. 8B, by applying a high voltage potential VH to the drain of the TFT and a low voltage potential VL to the source of the TFT, and connecting the gate and source by a diode, a drain current I proportional to the illuminance of the light LR, and the light LG, and the light LB can be made to flow in addition to the drain current Ioff caused by dark current, the same as described in FIG. 3B for the first embodiment.

FIGS. 8A and 8B show the drain current IR when the light LRref for the wavelength λ (R) is irradiated on the TFT, and the drain current IG when the light LGref of wavelength λ (G) is irradiated on the TFT, and the drain current IB when the light LBref of wavelength λ (B) is irradiated on the TFT. If the illuminance when no light L is irradiated on the TFT is regarded as 0 (zero), then as the illuminance of the light Lref irradiated onto the TFT rises to LV1, LV2, LV3, the drain current IR increases to IR1, IR2, IR3, the drain current IG to IG1, IG2, IG3, and the drain current IB to IB1, IB2, and IB3.

The display pixel TFT 2 for the image display apparatus of the first embodiment and the TFT utilized in the photo sensor circuit SEN are mainly fabricated in low-temperature polysilicon or amorphous silicon processes. The polysilicon layer is a thickness of about 50 nanometers so the shorter the light wavelength that is irradiated, the higher its absorption rate into the polysilicon film of the TFT. The light absorption rate therefore lowers in the order of wavelength λ (B), λ (G), and λ (R). Therefore the drain current IG when the light LG of wavelength λ (G), and the drain current IR when the light LR of wavelength λ (R) are irradiated, are extremely small electrical current values relative to the drain current IB during irradiation of the light LB of wavelength λ (B). In the TFT, the red filter 91 for trapping light in the vicinity of wavelength λ (R) at the peak light transmittance ratio, and the green filter 92 for trapping light in the vicinity of wavelength λ (R) at the peak light transmittance ratio, render the same light blocking layer effect as the black matrix 24.

Second Embodiment

Figure 9:
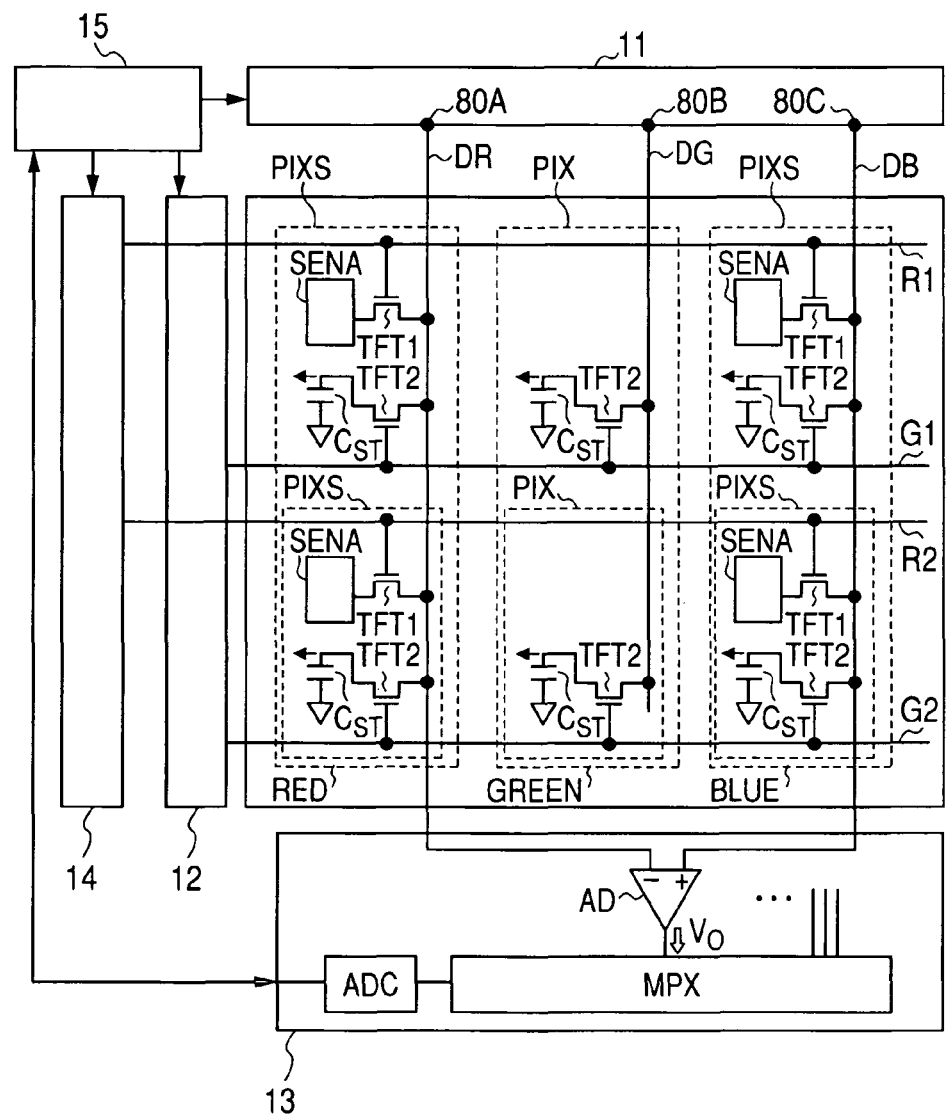
FIG. 9 is a block circuit diagram showing the image display apparatus of the second embodiment of this invention.

FIG. 9 is a block circuit diagram showing the image display apparatus of the second embodiment of this invention. The second embodiment differs from the first embodiment in the point that a photo sensor is formed in the image display apparatus made up of red, green and blue sub pixels. The other sections of the structure are identical to the first embodiment so a description of those identical sections is omitted. To simplify the description, the example given here utilizes a pixel circuit with two matrices each containing three sub pixels. The three color filters (red, green, blue) are fabricated on an opposing substrate (color filter board) and arrayed vertically in strips (top and bottom in FIG. 9).

By utilizing the characteristics described using FIGS. 8A and 8B, in the second embodiment, the TFT can detect the reflected light LREF from the user's touch by installing a first pixel PIXS containing a first photo sensor SENA for receiving external light input from the observation side in a blue pixel for trapping light in the vicinity of wavelength λ B) at the peak light transmittance ratio. Also by installing a red pixel for trapping light in the vicinity of wavelength λ (R) at the peak light transmittance ratio in a first pixel PIXS in the same way, a state that essentially blocks the light can be attained where the TFT detection level for touch-reflected light $L_{REF}$ is low. Moreover, a pixel circuit PIX without a photo sensor is installed in the green sub pixel. Installing the pixels as described above renders same effect as in the first embodiment without having to install a light-blocking black matrix (or similar item) in the photo sensing TFT as in the first embodiment.

Third Embodiment

Figure 10:
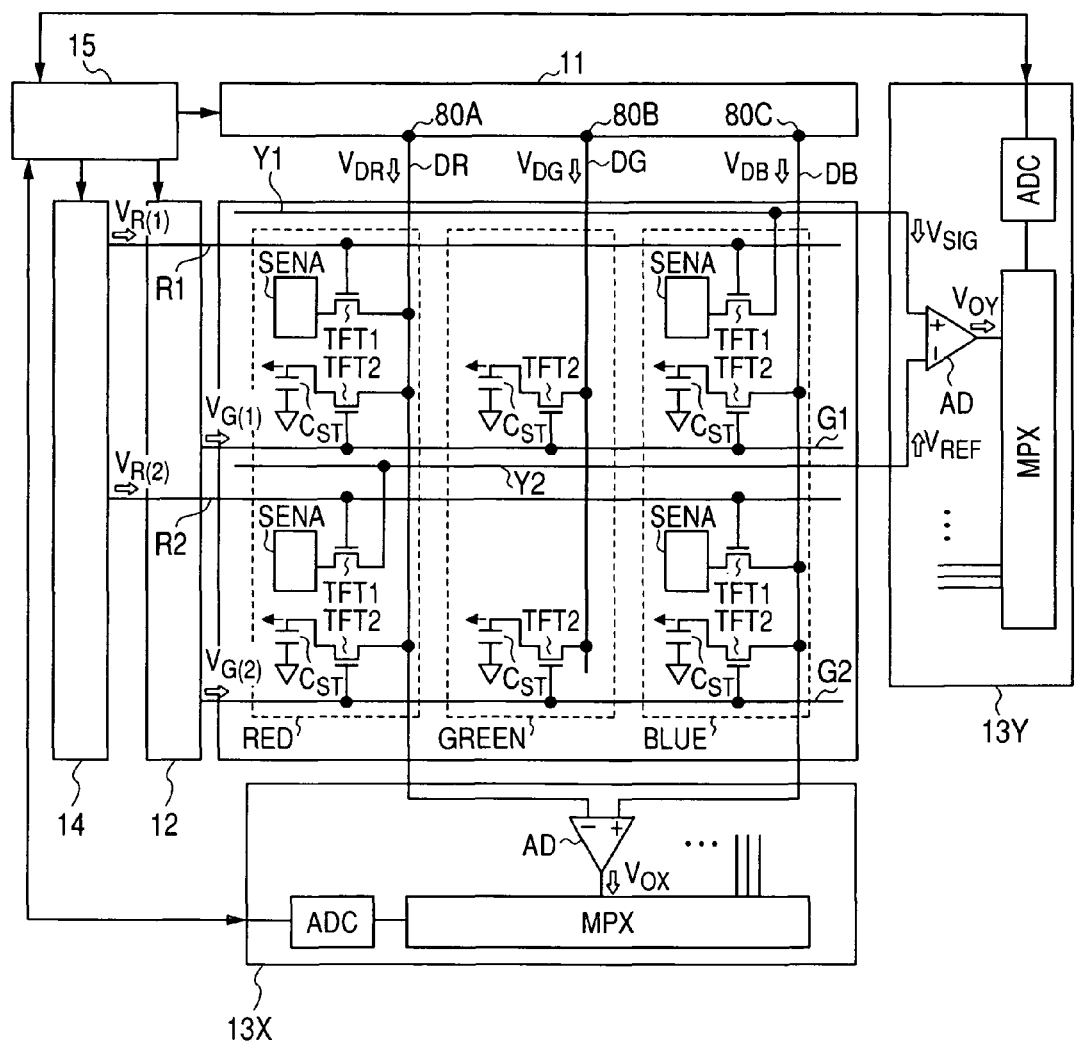
FIG. 10 is a block circuit diagram for describing the third embodiment of the image display apparatus of this invention.

FIG. 10 is a block circuit diagram for describing the third embodiment of the image display apparatus of this invention. Compared to the second embodiment, the third embodiment differs in the point that a structure for horizontally (to the left and right in FIG. 10) outputting the detection signal has been added. Only this differing point is described here and a description of sections identical to the second embodiment is omitted. In FIG. 10, the first row of switching TFT 1 for red sub pixels are connected to data line DR, and the second row of switching TFT 2 for blue sub pixels are connected to the data line DB. Signals read out from the first row of red sub pixels and the second row of blue sub pixels can be sent to the X address detection circuit 13X by connecting these data lines are connected to the X address detection circuit (sensor signal processor circuit) 13X.

The switching TFT1 for the second row of red sub pixels connects to the read signal line R2, and the TFT2 connects to the data line DR, and the switching TFT1 for the first row of blue sub pixels connects to the read signal line R1. The signals read out from the second row of red sub pixels and the first row of blue sub pixels are sent to the Y address detection circuit 13Y by connecting these read signal lines R1, R2 to the Y address detection circuit (sensor signal processor circuit) 13Y.

The detector circuits can in this way read out the photo detection signals horizontally and vertically (X and Y directions) in one read out for each frame without having to scan the read lines R1 and R2. Eliminating the scanning of the read lines renders the effect that no scanning circuit such as a shift register is required in the sensor driver 14, the circuitry can be simplified, and a speed up in detection time achieved. The drive timing is shown in detail in FIG. 11.

Figure 11:
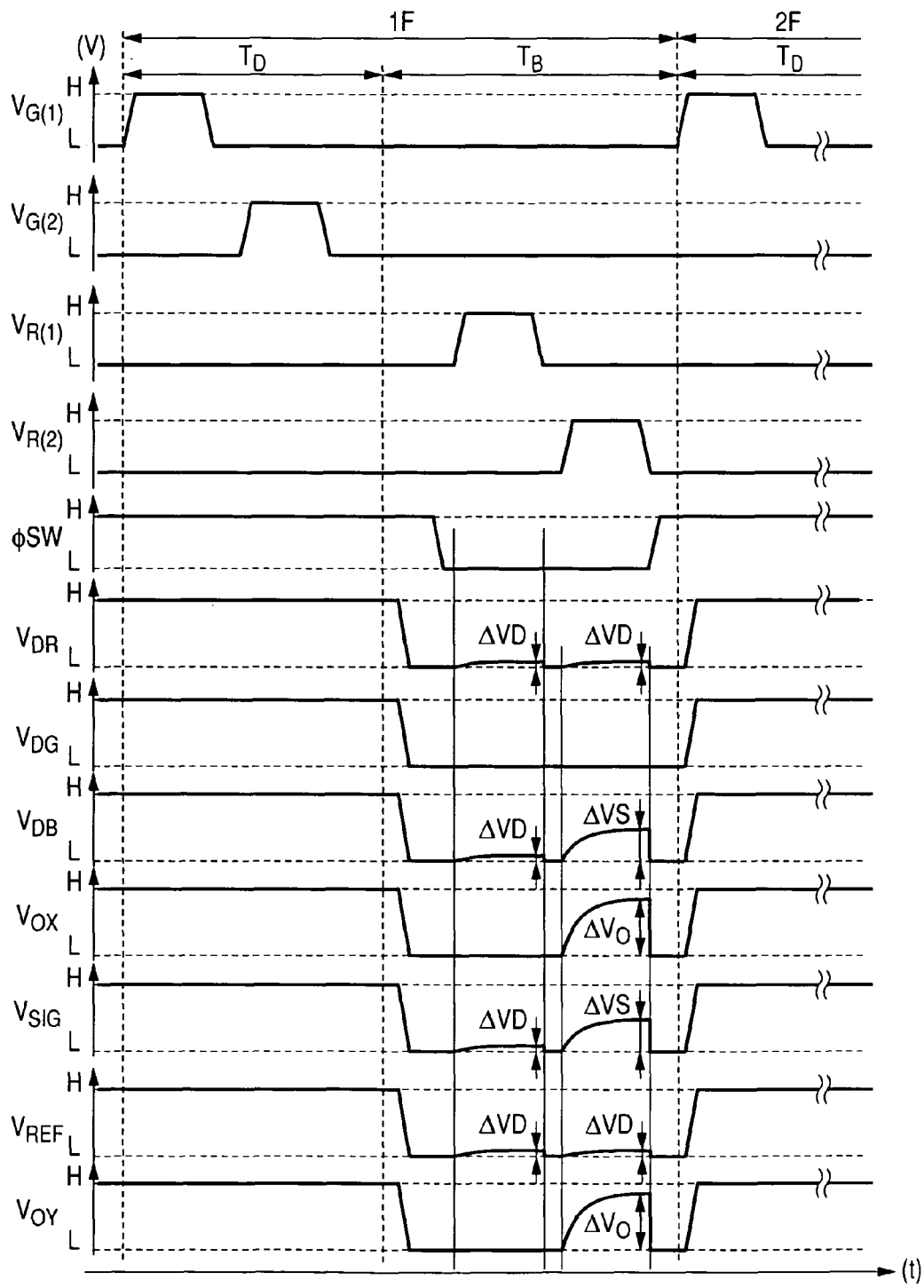
FIG. 11 is a timing chart for describing the drive timing in the third embodiment of the image display apparatus of this invention.

FIG. 11 is a timing chart for describing the drive timing in the third embodiment of the image display apparatus of this invention. Here, a single frame (1F) is separated into a display period $T_D$ and a blanking period $T_B$ the same as in the drive timing for the first embodiment in FIG. 5. The display period $T_D$ is identical to that in the first embodiment so a description is omitted. The photo sensing (or photo detection) operation is performed in the blanking period $T_D$ the same as in the first embodiment but the operation is different so only that point is described.

The selector switches 80A, 80B, 80C first of all switch the selector signal φSW from high level (H) to low level (L) to isolate the data lines DR, DG, DG from the data driver 11. Simultaneously with switching the selector signal, the read clocks $V_{R(1)}$, $V_{R(2)}$ for the read lines R1, R2 transition from low level (L) to high level (H), so that the signal current read from within all the pixels is converted to the signal voltages $V_{DR}$, $V_{DG}$ and $V_{DB}$ on data lines DR, DG, DG, and the signal voltages $V_{SIG}$, $V_{REF}$ on the read signal lines Y1, Y2, and respectively sent to the X address detection circuit 13X, and the Y address detection circuit 13Y.

Here, the ΔVD is a voltage differential made up of backlight light LBL signal components. The ΔVS is a voltage differential made up of backlight light LBL and touch-reflected light LREF signal components. The higher the intensity of the light LREF irradiated onto the photo sensor TFT 61, the larger the voltage differential ΔVS. The differential amplifier AD in the X address detection circuit 13X in FIG. 10, amplifies the differential in the signal voltages $V_{DR}$, $V_{DB}$ on the data line DR and the data line DB, and sends the signal values digitally converted in the analog-digital converter ADC to the control circuit 15. The Y address detection circuit 13Y simultaneously amplifies the differential between the signal voltages $V_{SIG}$ and $V_{REF}$ on the signal line Y1 and the signal line Y2 in the differential amplifier AD, and sends the signal values digitally converted in the analog-digital converter ADC to the control circuit 15.

Decision information on whether or not the user's finger touched the screen based on signal values processed in the X address detection circuit 13X and the Y address detection circuit 13Y is sent simultaneously with address information (two-dimensional coordinates) to the control circuit 15 so that a speed up in detection time achieved.

Fourth Embodiment

Figure 12:
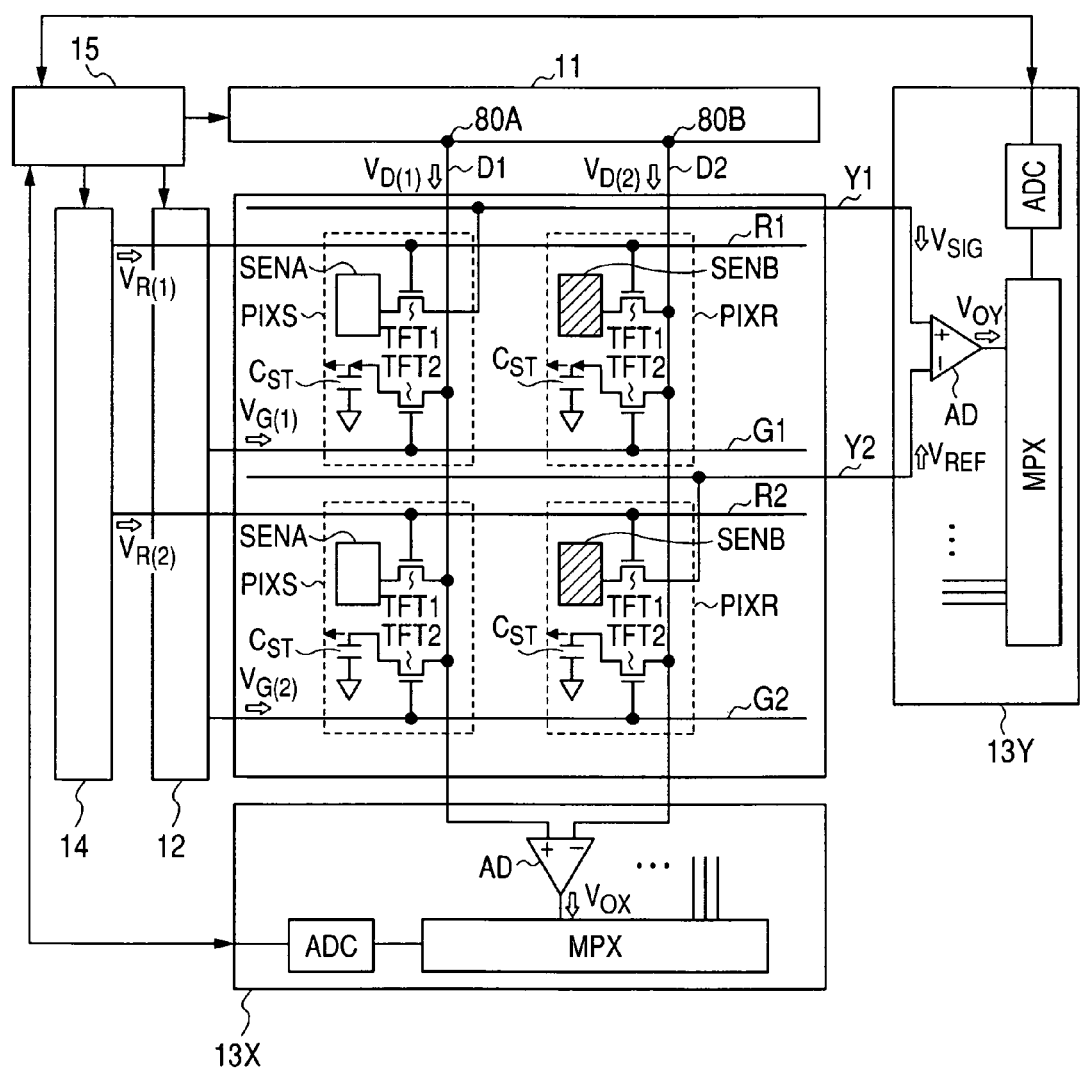
FIG. 12 is a circuit diagram for describing the image display apparatus of the fourth embodiment of this invention.

FIG. 12 is a circuit diagram for describing the image display apparatus of the fourth embodiment of this invention. The fourth embodiment has been added with the Y address detection circuit (sensor signal processor circuit) 13Y shown in the third embodiment in FIG. 10, and the X address detection circuit (sensor signal processor circuit) 13X of the sensor signal processor circuit 13 of the first embodiment as described in FIG. 4. To simplify the description only a 2×2 pixel (matrix) is shown in FIG. 12.

In the fourth embodiment, the pixel circuit includes a first pixel containing a first photo sensor SENA for receiving the external light irradiated from the observation side of the screen; and a second pixel containing a second photo sensor SENB shielded from external light. The gate lines G1, G2 connected to the pixel circuit, extend in a first direction, and a first data line D1 connecting only to the first pixel, and a second data line D2 connecting to a second pixel, extend in a second direction intersecting the first direction; and sensor read lines Y1, Y2 connecting alternately to the first pixel and the second pixel, extend in the first direction.

The fourth embodiment also includes a gate driver 12 for applying a pixel select signal to the gate line, and data driver 11 for supplying display data to the pixel selected by the pixel select signal by way of the data line and, an X address detection circuit 13X connecting to the first data line D1 and the second data line D2, and a Y address detection circuit 13Y connected to the read lines Y1, Y2, and a sensor driver 14. The read lines R1 and R2 connect to the gate electrode of the switching TFT1 connected to the photo sensor, and convey the read signals $V_{R(1)}$ and $V_{R(2)}$ from the sensor driver 14 (to the gate driver 12).

In this fourth embodiment, decision information on whether or not the user's finger touched the screen based on signal values processed in the X address detection circuit 13X and the Y address detection circuit 13Y connected to the sensor read lines Y1, Y2 is sent simultaneously with address information (two-dimensional coordinates) to the control circuit 15 so that a speed up in detection time achieved.

Fifth Embodiment

Figure 13:
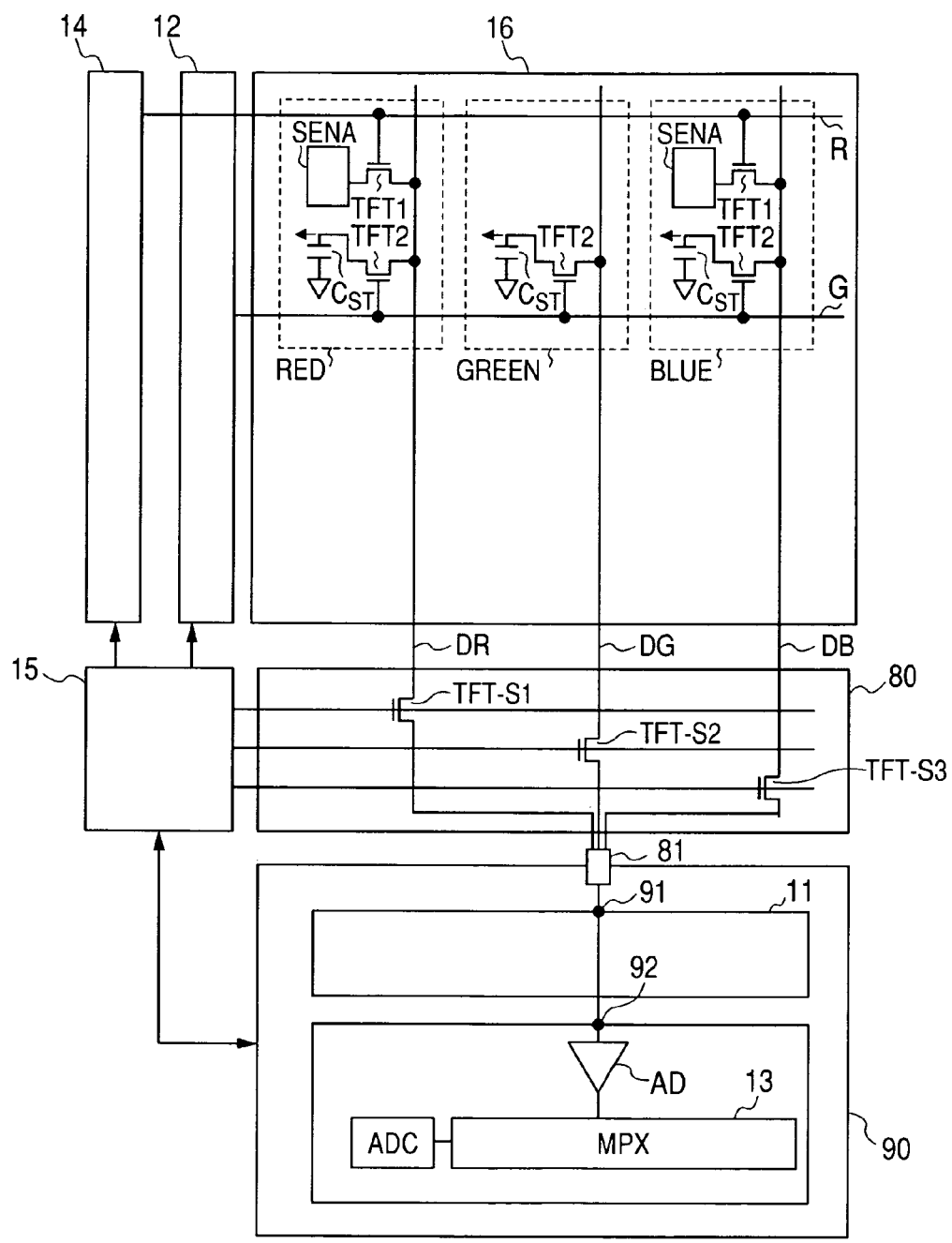
FIG. 13 is a circuit diagram for describing the image display apparatus of the fifth embodiment of this invention.

FIG. 13 is a circuit diagram for describing the image display apparatus of the fifth embodiment of this invention. This fifth embodiment differs from the second embodiment in the peripheral circuit structure. This differing point is described here and a description of the structure identical to the second embodiment is omitted. A RGB selector switch 80 for selecting the red, green, blue signal lines is mainly formed on the glass substrate in the low-temperature polysilicon TFT process where there is high electron mobility in the transistor, and the number of output terminals connecting to the driver IC 90 making up the data driver can be reduced to one-third the number of terminals in the related art. The RGB selector switch 80 includes the TFT-S1, TFT-S2 and the TFT-S3.

The RGB selector switch 80 structure may be a simple analog switch utilizing TFT as described above. Taking advantage of this structure, in this embodiment the data driver 11 and the sensor signal processor circuit 13 are connected to the data line terminals, and the selector switch 80 switches to the sensor signal processor 13 or the data driver 11 from the output terminal 81 for transmission of video signals and transmission of detection signals. The selector switches 91 and 92 are also used for this switching. A data driver and a detection circuit 13 are fabricated within the driver IC, and are connected to the output terminals by the selector switch 80.

The first through the fourth embodiments required a separately installed output terminal on the glass substrate in order to connect the sensor signal processor circuit. In the fifth embodiment however a sensor signal processor circuit can be installed without having to add any output terminals to the glass substrate. The drive timing is identical to the drive timing for the first embodiment as described in FIG. 5.

Figure 14:
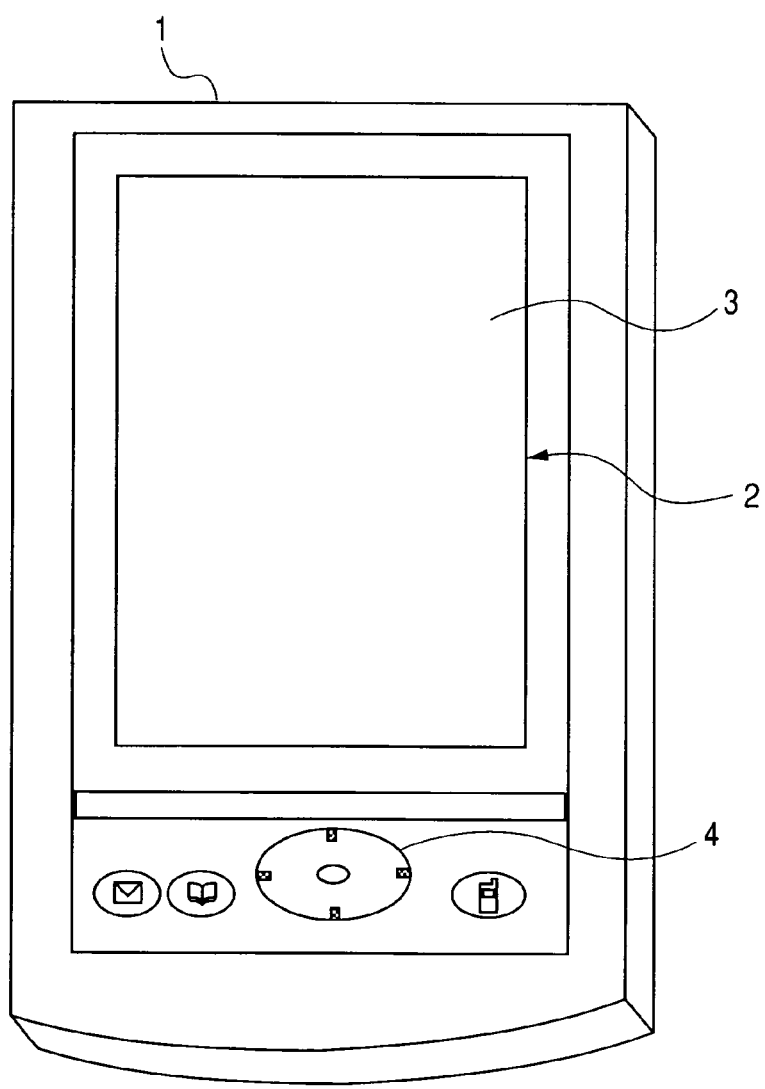
FIG. 14 is a drawing showing the mobile electronic device using the image display apparatus of this invention.
Figure 15:
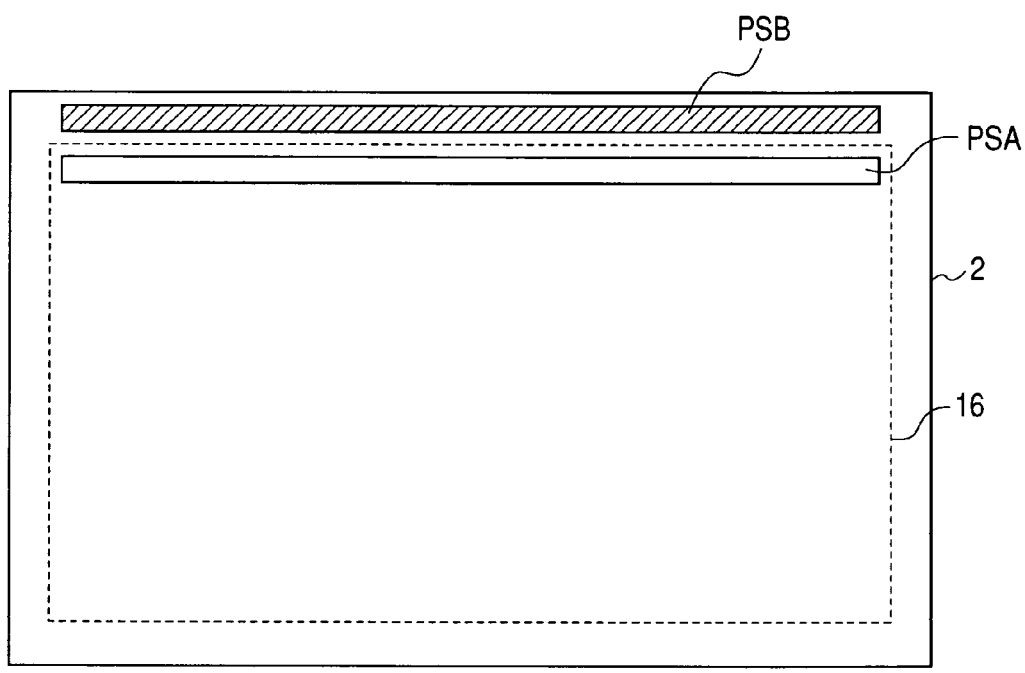
FIG. 15 is a concept view for describing the pixel structure in an image display apparatus of the related art with the image entry function formed from photo sensors within the pixel.
Figure 16:
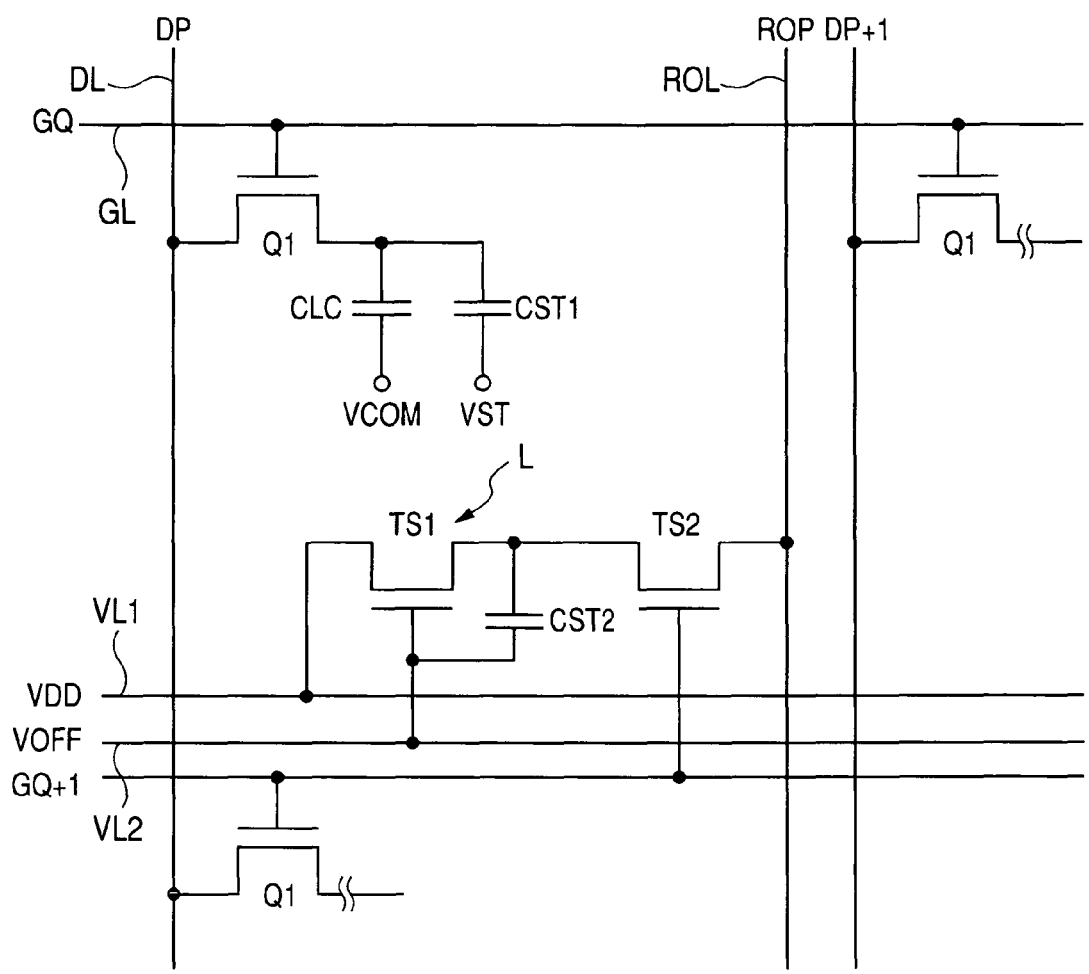
FIG. 16 is an equivalent circuit diagram for describing the pixel structure for an image display apparatus of the related art with an image entry function made up of photo sensors as pixels.

FIG. 14 is a drawing showing the mobile electronic device using the image display apparatus of this invention. A mobile electronic device 1 contains the image display apparatus 2 of this invention, and a D-pad (or 4-direction control) key 4. By applying the image display apparatus of this invention, a user interface with a touch panel function can be provided that performs selective processing by the user touching the display (object) such as an icon on the display screen 3 of the image display apparatus 2 without requiring a dedicated touch panel module.

What is claimed:

1. An image display apparatus with image entry function comprising:
    a plurality of pixel circuits disposed in a display region, each of said plurality of pixel circuits comprising a first pixel and a second pixel, each said first pixel containing a first photo sensor for receiving light irradiated from the observation side of the screen, and each said second pixel containing a second photo sensor continuously shielded from external light;
    a gate line extending in a first direction and connecting alternately to some of the first pixels and some of the second pixels;
    a plurality of first data lines extending in a second direction intersecting the first direction, each of the plurality of first data lines connects to some of the first pixels and disconnects to the second pixels;
    a plurality of second data lines extending in the second direction, each of the plurality of second data lines connects to some of the second pixels and disconnects to the first pixels, the plurality of the first data lines and the plurality of the second data lines are disposed alternately in the first direction;
a sensor read line extending in the first direction and connecting alternately to some of the first pixels and some of the second pixels in a display region;
a gate driver for applying a pixel select signal to the gate line;
a data driver for supplying display data by way of the data line to the pixel selected by the pixel select signal;
a sensor driver connected to the sensor read line;
a first sensor signal processor circuit connecting to the plurality of first data lines and the plurality of second data lines;
a plurality of first signal lines extending in the first direction, each of the plurality of first signal lines connecting to some of the first pixels and disconnecting to the second pixel;
a plurality of second signal lines extending in the first direction, each of the plurality of second signal lines connecting to some of the second pixels and disconnecting to the first pixel; and
a second sensor signal processor circuit connecting to the plurality of first signal lines and the plurality of second signal lines,
wherein the first sensor signal processor circuit senses the secondary coordinates where the screen was touched based on the first photo sensor signal and the second photo sensor signal input by way of the plurality of the first data lines and the plurality of the second data lines.

2. The image display apparatus with image entry function according to claim 1,
wherein the first sensor signal processor circuit includes a differential amplifier circuit, and generates secondary coordinates by utilizing a signal from one of the plurality of second data lines as a reference signal and a signal from the first data line disposed adjacent to the one of the plurality of second data lines.

3. The image display apparatus with image entry function according to claim 1, further comprising a selector switch for switching to a display period or a blanking period among the plurality of first data lines and the plurality of second data lines and the data driver.

4. The image display apparatus with image entry function according to claim 3,
wherein signals from the first photo sensors and the second photo sensors are input to the first sensor signal processor circuit for generating the secondary coordinates in the blanking period that the selector switch selected.

5. The image display apparatus with image entry function according to claim 1, wherein the pixels are liquid crystal display pixels.

6. The image display apparatus with image entry function according to claim 1, wherein the pixels are electroluminescent display pixels.

7. The image display apparatus with image entry function according to claim 6, wherein the pixels are organic electroluminescent light emitting diodes.

8. The image display apparatus with image entry function according to claim 1,
wherein the first photo sensor and the second photo sensor are made from PIN diodes, and
wherein the PIN (positive negative intrinsic) diodes include drain and source electrodes.

9. The image display apparatus with image entry function according to claim 8, wherein a capacitor is connected in parallel with the drain and source terminals of the PIN diode.

10. The image display apparatus with image entry function according to claim 1,
wherein the first photo sensor and the second photo sensor are made from thin film transistors, and
wherein the thin film transistors include drain and gate and source terminals.

11. The image display apparatus with image entry function according to claim 10, wherein the gate and source electrodes of the thin film transistor are shorted together.

12. The image display apparatus with image entry function according to claim 10, wherein a capacitor is connected in parallel with the drain and source electrodes of the thin film transistor.

13. The image display apparatus with image entry function according to claim 2, wherein the sensor signal processor circuit generates the secondary coordinates by amplifying the differential between signal voltage of the one of the plurality of second data lines and signal voltage of the first data line disposed adjacent to the one of the plurality of second data lines using the differential amplifier circuit.

14. An image display apparatus with image entry function comprising:
a plurality of pixel circuits disposed in a display region, each of said plurality of pixel circuits comprising a first pixel and a second pixel, each said first pixel containing a first photo sensor for receiving light irradiated from the observation side of the screen, and each said second pixel containing a second photo sensor continuously shielded from external light;
a gate line extending in a first direction and connecting alternately to some of the first pixels and some of the second pixels;
a plurality of first data lines extending in a second direction intersecting the first direction, each of the plurality of first data lines connects to some of the first pixels and disconnects to the second pixels;
a plurality of second data lines extending in the second direction, each of the plurality of second data lines connects to some of the second pixels and disconnects to the first pixels; the plurality of the first data lines and the plurality of the second data lines are disposed alternately in the first direction;
a sensor read line extending in the first direction and connecting alternately to some of the first pixels and some of the second pixels in a display region;
a gate driver for applying a pixel select signal to the gate line;
a data driver for supplying display data by way of the data line to the pixel selected by the pixel select signal;
a sensor driver connected to the sensor read line; and
a first sensor signal processor circuit connecting to the plurality of first data lines and the plurality of second data lines,
wherein the first sensor signal processor circuit senses the secondary coordinates where the screen was touched based on the first photo sensor signal and the second photo sensor signal input by way of the plurality of the first data lines and the plurality of the second data lines; and
wherein the plurality of first pixels and the plurality of second pixels comprise at least two first pixels and at least two second pixels, respectively, alternately spaced in the first direction.

15. The image display apparatus with image entry function according to claim 14,
wherein the first sensor signal processor circuit includes a differential amplifier circuit, and generates secondary coordinates by utilizing a signal from one of the plurality of second data lines as a reference signal and a signal from the first data line disposed adjacent to the one of the plurality of second data lines.

16. The image display apparatus with image entry function according to claim 14, further comprising a selector switch for switching to a display period or a blanking period among the plurality of first data lines and the plurality of second data lines and the data driver.

17. The image display apparatus with image entry function according to claim 16,
wherein signals from the first photo sensors and the second photo sensors are input to the first sensor signal processor circuit for generating the secondary coordinates in the blanking period that the selector switch selected.

18. The image display apparatus with image entry function according to claim 14, further comprising:
a plurality of first signal lines extending in the first direction, each of the plurality of first signal lines connecting to some of the first pixels and disconnecting to the second pixel;
a plurality of second signal lines extending in the first direction, each of the plurality of second signal lines connecting to some of the second pixels and disconnecting to the first pixel; and
a second sensor signal processor circuit connecting to the plurality of first signal lines and the plurality of second signal lines.

19. The image display apparatus with image entry function according to claim 14, wherein the pixels are liquid crystal display pixels.

20. The image display apparatus with image entry function according to claim 14, wherein the pixels are electroluminescent display pixels.

21. The image display apparatus with image entry function according to claim 20, wherein the pixels are organic electroluminescent light emitting diodes.

22. The image display apparatus with image entry function according to claim 14,
wherein the first photo sensor and the second photo sensor are made from PIN diodes, and
wherein the PIN (positive negative intrinsic) diodes include drain and source electrodes.

23. The image display apparatus with image entry function according to claim 22, wherein a capacitor is connected in parallel with the drain and source terminals of the PIN diode.

24. The image display apparatus with image entry function according to claim 14,
wherein the first photo sensor and the second photo sensor are made from thin film transistors, and
wherein the thin film transistors include drain and gate and source terminals.

25. The image display apparatus with image entry function according to claim 14, wherein the gate and source electrodes of the thin film transistor are shorted together.

26. The image display apparatus with image entry function according to claim 24, wherein a capacitor is connected in parallel with the drain and source electrodes of the thin film transistor.

27. The image display apparatus with image entry function according to claim 15, wherein the first sensor signal processor circuit generates the secondary coordinates by amplifying the differential between signal voltage of the one of the plurality of second data lines and signal voltage of the first data line disposed adjacent to the one of the plurality of second data lines using the differential amplifier circuit.

* * * * *